United States Patent [19]
Sacharski et al.

[11] Patent Number: 5,965,213
[45] Date of Patent: Oct. 12, 1999

[54] AQUEOUS DISPERSIONS OF A TRANSPARENT POWDER COATING

[75] Inventors: Lawrence Sacharski, Eastpointe, Mich.; Joachim Woltering, Münster, Germany; Peter Clark, Harland, Mich.; Heinrich Wonnemann, Telgte, Germany

[73] Assignee: BASF Coatings AG, Muenster-Hiltrup, Germany

[21] Appl. No.: 08/930,160

[22] PCT Filed: Apr. 4, 1996

[86] PCT No.: PCT/EP96/01480

§ 371 Date: Feb. 2, 1998

§ 102(e) Date: Feb. 2, 1998

[87] PCT Pub. No.: WO96/32452

PCT Pub. Date: Oct. 17, 1996

[51] Int. Cl.$^6$ .............. B05D 1/04; C08K 5/092; C08K 5/205

[52] U.S. Cl. .............. 427/475; 427/484; 516/77; 523/410; 524/902; 524/904; 525/934; 526/932

[58] Field of Search .............. 252/311; 524/902, 524/904; 525/934; 526/932; 523/412, 410; 516/77; 427/475, 480, 484

[56] References Cited

U.S. PATENT DOCUMENTS

| | | |
|---|---|---|
| 3,781,379 | 12/1973 | Theodore et al. |
| 3,907,737 | 9/1975 | Marx et al. .............. 525/934 X |
| 4,091,048 | 5/1978 | Labana et al. |
| 4,137,349 | 1/1979 | Sakakibara et al. |
| 4,181,642 | 1/1980 | Holle et al. |
| 4,268,542 | 5/1981 | Sakakibara et al. .............. 427/195 |
| 4,312,795 | 1/1982 | Taguchi et al. .............. 524/904 X |
| 4,346,144 | 8/1982 | Craven .............. 524/904 X |
| 5,055,524 | 10/1991 | Pettit, Jr. et al. |
| 5,270,416 | 12/1993 | Toman et al. |
| 5,378,756 | 1/1995 | Thies et al. .............. 524/591 |
| 5,612,397 | 3/1997 | Gebhard et al. .............. 524/902 X |

FOREIGN PATENT DOCUMENTS

| | | | |
|---|---|---|---|
| 22 14 650 | 3/1972 | Germany | .............. C09D 3/80 |
| 27 49 576 B2 | 11/1977 | Germany | .............. C08F 220/18 |
| 07 696 835 | 8/1976 | Japan . | |
| 07 778 939 | 7/1977 | Japan . | |
| 1 338 204 | 3/1972 | United Kingdom | .............. C08G 30/00 |

OTHER PUBLICATIONS

Chemical Abstract: Sakakibara; "Formation of thin coating"; Jan. 9, 1978; vol. 88. No. 2, abstract No. 8608s.

Chemical Abstract; Sakae, N.; "Abrasive Polishing of Coating Films"; Dec. 13, 1976; vol. 85, No. 24 abstract No. 179111s.

*Primary Examiner*—Richard D. Lovering

[57] ABSTRACT

Disclosed is an aqueous dispersion of a transparent powder coating consisting of a solid powder component and an aqueous component. The solid powder component includes at least one epoxy group-containing binder, at least one crosslinking agent, and optionally catalysts, adjuvants, or additives typical for transparent powder coatings. The binder contains 30–45% glycidyl-containing monomers and optionally vinylaromatic compounds such as styrene. The crosslinking agent is preferably a straight-chain aliphatic dicarboxylic acid and/or a carboxy-functional polyester. The aqueous component includes at least one nonionic thickener and optional materials such as catalysts, adjuvants, and/or other such materials. The nonionic thickener is preferably a nonionic associative thickener. The invention also provides a process for preparing the aqueous dispersion of the invention and a process for coating a vehicle body with the aqueous dispersion of the invention.

19 Claims, No Drawings

AQUEOUS DISPERSIONS OF A TRANSPARENT POWDER COATING

This application is a national stage application under 35 U.S.C. § 371 of International Application PCT/EP96/01480, filed Apr. 4, 1996, which claims priority to U.S. application Ser. No. 08/419,296, filed Apr. 10, 1995 and now abandoned.

The present invention relates to an aqueous dispersion of a transparent powder coating, which is particularly suitable as a coating for vehicle bodies coated with water-based basecoat.

Nowadays, for the purpose of coating vehicle bodies, liquid coating materials preferably are employed. Such materials cause numerous environmental problems due to their solvent content. This also applies to the use of water-based coating materials.

This is the reason why increased efforts have been made in recent years to employ powder coatings in the coating step. However, the results have not been satisfying up to now; in particular, it is necessary to provide coatings with an increased thickness in order to obtain a uniform appearance. On the other hand, the use of coating materials in powder form necessitates a different application technology. The plants designed for liquid coating materials cannot therefore be employed for the powders. Hence, an attempt is being made to develop aqueous dispersions of powder coatings, which may be processed by means of liquid-coating technologies.

U.S. Pat. No. 4,268,542, for example, discloses a process employing a powder coating slurry which is suitable for the coating of vehicles. In this process, a conventional powder coat is first applied to the bodywork, and the transparent coating slurry is applied as a second coat. In this transparent coating slurry based on acrylate resins, ionic thickeners are used which lead to a relatively high sensitivity of the applied coat to moisture, especially to condensation. Furthermore, in one of the examples these have a content of from 0.5 to 30% of glycidyl-containing monomers. Moreover, it is necessary to operate with high baking temperatures (over 160° C.).

In the text which follows, the terms transparent powder coating dispersion and powder clearcoat are used synonymously.

It is an object of the present invention to provide an aqueous dispersion of a transparent powder coating, which may be applied to vehicle bodies by means of the conventional liquid-coating technology and which may particularly be baked even at temperatures of 130° C.

This object is achieved by an aqueous dispersion of a transparent powder coating, consisting of a solid powder component A and an aqueous component B, wherein component A is a transparent powder coating comprising
  (a) at least one epoxy group-containing binder having a content of glycidyl-containing monomers of from 30 to 45%, preferably from 30 to 35%, and optionally having a content of vinylaromatic compounds, preferably styrene;
  (b) at least one crosslinking agent, preferably straight-chain aliphatic dicarboxylic acids and/or carboxy-functional polyesters; and
  (c) optionally catalysts, adjuvants, additives typical for transparent powder coatings, such as deaerating agents, levelling agents, UV absorbers, radical scavengers and antioxidants; and component B is an aqueous dispersion comprising
  (a) at least one nonionic thickener; and
  (b) optionally catalysts, adjuvants, defoamers, dispersion adjuvants, wetting agents, preferably carboxy-functional dispersants, antioxidants, UV absorbers, radical scavengers, small amounts of solvents, levelling agents, biocides and/or water retaining agents.

The epoxy functional binder for the solid transparent powder coating used for the preparation of the dispersion comprises, for example, epoxy group-containing polyacrylate resins which are preparable by copolymerisation of the least one ethylenically unsaturated monomer containing at least one epoxy group within the molecule and at least one further ethylenically unsaturated monomer containing no epoxy group within the molecule, at least one of the monomers being an ester of acrylic acid or methacrylic acid. Such epoxy group-containing polacrylate resins are, for example, known from EP-A-299 420; DE-B-22 14 650; DE-B-27 49 576; U.S. Pat. No. 4,091,048 and U.S. Pat. No. 3,781,379.

Examples of ethylenically unsaturated monomers containing no epoxy group within the molecule are alkyl esters of acrylic acid and methacrylic acid containing 1 to 20 carbon atoms in thealkyl radical, perticularly methyl acrylate, methyl methacrylate, ethyl acrylate, ethyl methacrylate, butyl acrylate, butyl methacrylate, 2-ethylhexyl acrylate and 2-ethylhexyl methacrylate. Further examples of ethylenically unsaturated monomers containing no epoxy groups within the molecule are acid amides, for example acrylamide and methacrylamide, vinylaromatic compounds, such as sturene, methylstyrene and vinylzoluene, nitriles, such as acrylonitrile and methacrylonitrile, vinyl halides and vinylidene halides, such as vinyl chloride and vinylidene fluoride, vinyl esters, for example vinyl acetate, and hydroxyl-containing monomers, for example hydroxyethyl acrylate and hydroxyethyl methacrylate.

The epoxy-functional binders are epoxy group-containing polyacrylate resins where the epoxy-functional monomers are selected from glycidyl acrylate, glycidyl methacrylate and allyl glycidyl ether.

The epoxy group-containing polyacrylate resin usually has an epoxy equivalent weight of from 400 to 2500, preferably from 420 to 700, a number-average molecular weight of from 2000 to 20,000, preferably from 3000 to 10,000 (determined by gel permeation chromatography using a polystyrene standard) and a glass transition temperature ($T_G$) of from 30 to 80° C., preferably from 40 to 70° C., more preferably from 40 to 60° C. (measured using differential scanning calorimetry (DSC)).

About 50° C. is most preferred. Blends of two or more acrylate resins may also be employed.

The epoxy group-containing polyacrylate resin may be prepared in accordance with generally well-known methods by polymerisation.

Suitable crosslinking agents are carboxylic acids, in particular saturated straight-chain aliphatic dicarboxylic acids having 3 to 20 carbon atoms within the molecule. Most preferably, dodecane-1,12-dicarboxylic acid is used. In order to modify the properties of the final transparent powder coatings, other carboxyl-containing crosslinking agents may optionally be employed. As examples of such crosslinking agents there may be mentioned saturated branched or unsaturated straight-chain dicarboxylic acids and polycarboxylic acids as well as polymers having carboxyl groups.

Additionally, transparent powder coatings are suitable which contain an epoxy-functional crosslinking agent and an acid-functional binder.

As the acid-functional binder, suitable examples are acidic polyacrylate resins, which are preparable by copolymerizing at least one ethylenically unsaturated monomer containing at least one acid group within the molecule with at least one further ethylenically unsaturated monomer containing no acid group within the molecule.

The epoxy group-containing binder and the epoxy group-containing crosslinking agent, respectively, and the carboxyl-containing binder and the carboxyl-containing crosslinking agent, respectively, are usually emnployed in an amount such that there are 0.5 to 1.5 equivalents, preferably 0.75 to 1.25 equivalents, of carboxyl groups per equivalent of epoxy groups. The amount of carboxyl groups present may be determined by titration with an alcoholic KOH solution.

In accordance with the invention, the binder contains vinylaromatic compounds, particularly styrene. In order to limit the danger of fissure formation, the content is not, however, more than 35% by weight. 10 to 25% by weight is preferred.

The solid powder coatings optionally contain one or more catalysts suitable for epoxy resin curing. Suitable catalysts are phosphonium salts of organic or inorganic acids, quaternary ammonium compounds, amines, imidazole and imidazole derivatives. The catalysts are generally employed in amounts of from 0.001% by weight to about 2% by weight, based on the total weight of the epoxy resin and the cross-linking agent.

Examples of suitable phosphonium catalysts are ethyltriphenylphosphonium iodide, ethyltriphenylphosphonium chloride, ethyltriphenylphosphonium thiocyanate, complex of ethyltriphenylphosphonium acetate and acetic acid, tetrabutylphosphonium iodide, tetrabutylphosphonium bromide and complex of tetrabutylphosphonium acetate and acetic acid. These and other suitable phosphonium catalysts are, for example, described in U.S. Pat. No. 3,477,990 and U.S. Pat. No. 3,341,580.

Suitable imidazole catalysts are, for example, 2-styrylimidazole, 1-benzyl-2-methylimidazole, 2-methylimidazole and 2-butylimidazole. These and other imidazole catalysts are, for example, described in the Belgian Patent No. 756,693.

In addition, the solid powder coatings may optionally contain adjuvants and additives. These are exemplified by levelling agents, antioxidants, UV absorbers, radical scavengers, flow aids and deaerating agents, such as benzoin.

The solid powder coatings are prepared by known methods (see, for example, product information by the company BASF Lacke+Farben AG, "Pulverlacke", 1990) by homogenizing and dispersing, for example by means of an extruder, screw-type kneading machine and the like. After their preparation, the powder coatings are prepared for the dispersion operation by milling and optionally by sifting and screening.

The aqueous dispersion of the transparent powder coating can subsequently be prepared from the powder by wet milling or by introduction of dry-milled powder coating material, with stirring. Wet milling is particularly preferred.

The present invention also relates, accordingly, to a process for preparing an aqueous dispersion of a powder coating on the basis of the component A as described above, which is, in accordance with the invention, dispersed in a component B. The latter consists of an aqueous dispersion of catalysts, adjuvants, antifoams, antioxidants, wetting agents, UV absorbers, radical scavengers, biocides, water retaining agents, small amounts of solvents and/or dispersion adjuvants, preferably carboxy-functional dispersion adjuvants.

As a further essential constituent, the aqueous component B of the powder coating dispersion contains at least one nonionic m thickener a). Preference is given to the use of nonionic associative thickeners a).

Structural features of such associative thickeners a) are:
aa) a hydrophilic structure which ensures adequate solubility in water, and
ab) hydrophobic groups, which are capable of associative interaction in the aqueous medium.

Examples of hydrophobic groups employed are long-chain alkyl radicals, for example dodecyl, hexadecyl or octadecyl radicals, or alkaryl radicals, for example octylphenyl or nonylphenyl radicals.

Hydrophilic structures preferably employed are polyacrylates, cellulose ethers or, with particular preference, polyurethanes, which contain the hydrophobic groups as polymer units.

Hydrophilic structures which are most preferred are polyurethanes containing polyether chains as structural units, preferably comprising polyethylene oxide. In the synthesis of such polyetherpolyurethanes, the di- and/or polyisocyanates, preferably aliphatic diisocyanates, most preferably unsubstituted or alkyl-substituted 1,6-hexamethylene diisocyanate, are used to link the hydroxyl-terminated polyether units to one another and to link the polyether units with the hydrophobic end-group units, which may for example be monofunctional alcohols and/or amines bearing the long-chain alkyl radicals or aralkyl radicals already mentioned.

Following the dispersion of component A in component B. milling is carried out optionally, the pH is adjusted to from 4.0 to 7.0, preferably from 5.5 to 6.5, and the mixture is filtered.

The mean particle size is between 1 and 25 $\mu$m, preferably below 20 $\mu$m, particularly preferably from 3 to 10 $\mu$m. The solids content of the aqueous dispersion of the transparent powder coating is between 15 and 50%.

Before or after the wet milling or the incorporation of the dry powder coating into the water, there may be added to the dispersion from 0 to 5% by weight of a blend of defoamers, of an ammonium and/or alkali metal salt, of a carboxy-functional or nonionic dispersion adjuvant, of a wetting agent and/or of a thickener mixture as well as of the other additives above. Preferably, in accordance with the invention, defoamer, dispersion adjuvant, wetting agent and/or thickener are dispersed in water first. Then small portions of the transparent powder coating are stirred in. Then defoamer, dispersion adjuvant, thickener and wetting agent are dispersed into the mixture once again. Finally, small portions of the transparent powder coatings are stirred in again.

In accordance with the invention, the pH is preferably adjusted using ammonia or amines. The pH here may initially increase, so that a strongly basic dispersion is formed.

Within several hours or days, however, the pH falls again to the above-indicated values.

The dispersion of the transparent powder coating according to the invention may be used as a coating over basecoats preferably in the automotive industry. The clearcoat dispersion is particularly suitable for water-based coating materials based on a polyester, polyurethane resin and an amino resin.

The dispersions of the transparent powder coating according to the invention may be applied by the methods known from the liquid-coating technology. In particular, the dispersions may be applied by means of spray coating methods. However, electrostatically assisted high-speed rotation or pneumatic application are also suitable.

The dispersions of the transparent powder coating are, after application to the basecoat, usually flashed off before baking. This is appropriately done at room temperature first and then at slightly elevated temperature. Usually, the elevated temperature is from 40 to 70° C., preferably 50 to 65° C. The flashoff is carried out for from 2 to 10 minutes, preferably 4 to 8 minutes, at room temperature. Flashing off is carried out again for the same period of time at elevated temperature.

The baking step may even be carried out at temperatures of 130° C. Baking may be carried out at 130 to 180° C., preferably at 135 to 155° C.

With the process according to the invention it is possible to obtain coats having a thickness of 30 to 50 μm, preferably from 35 to 45 μm. In accordance with the prior art, clearcoats of comparable quality could be obtained only by applying coats having a thickness of 65 to 80 μm when employing transparent powder coatings.

The invention is described in more detail below with reference to the examples:

1. Preparation of the Acrylate Resin 21.1 parts of xylene are fed into a vessel and heated to 130° C. At 130° C. there are added, within a period of 4 h, via two separate feed vessels; initiator: 4.5 parts of TBPEH (tert-butyl perethylhexanoate) in a mixture with 4.86 parts of xylene; and monomers: 10.78 parts of methyl methacrylate, 25.5 parts of n-butyl methacrylate, 17.39 parts of styrene and 23.95 parts of glycidyl methacrylate. The mixture is then heated to 180° C., and the solvent is stripped off under a reduced pressure <100 mbar.

2. Preparation of the Transparent Powder Coating 77.5 parts of acrylate resin, 18.8 parts of dodecane dicarboxylic acid (acidic hardener), 2 parts of Tinuvin 1130 (UV absorber), 0.9 parts of Tinuvin 144 (HALS), 0.4 parts of Additol XL 490 (levelling agent) and 0.4 parts of benzoin (deaerating agent) are mixed intimately on a Henschel fluid mixer, and the mixture is extruded in a BUSS PLK 46 extruder, milled in a Hosohawa ACM 2 mill and screened by means of a 125 μm sieve.

3. Preparation of the Dispersion

In 400 parts of demineralized water, there are dispersed 0.6 parts of Troykyd D777 (defoamer), 0.6 parts of Orotan 731 K (dispersion adjuvant), 0.06 parts of Surfinol TMN 6 (wetting agent) and 16.5 parts of RM8 (Rohm & Haas, nonionic, associative, polyurethane-based thickener). Thereafter, 94 parts of the transparent powder coating are stirred in in small portions. A further 0.6 parts of Troykyd D777, 0.6 parts of Orotan 731 K, 0.06 parts of Surfinol TMN 6 and 16.5 parts of RM8 are dispersed into the mixture. Finally, 49 parts of the transparent powder coating are stirred in in small portions. The material is milled in a sand mill for 3.5 h. The average particle size finally measured is 4 μm. The material is filtered through a 50 μm filter and, finally, 0.05% Byk 345 levelling agent) is added.

4. Application of the Dispersion

By means of a bowl-type spray gun, the slurry is applied to steel panels coated with a water-based basecoat. The metal panel is flashed off for 5 minutes at room temperature and for 5 minutes at 60° C. Thereafter, the panel is baked for 30 minutes at a temperature of 140° C.

A high-gloss clearcoat film with a coat thickness of 40 μm is produced which has MEK resistance (>100 double strokes).

The clearcoat film possesses good resistance to condensation.

We claim:

1. An aqueous dispersion of a transparent powder coating, consisting of a solid powder component A and an aqueous component B, wherein component A is a transparent powder coating comprising
(a) at least one epoxy group-containing binder having a content of glycidyl-containing monomers of from 30 to 45%, and
(b) at least one crosslinking agent, and component B is an aqueous component comprising at least one nonionic thickener;

and further wherein the aqueous dispersion has a pH between 5.5 and 6.5.

2. The aqueous dispersion of a transparent powder coating of claim 1 wherein the epoxy-functional binder is an epoxy group-containing polyacrylate resin resulting from the polymerization of at least one epoxy-functional monomer selected from the group consisting of glycidyl acrylate, glycidyl methacrylate and allyl glycidyl ether.

3. The aqueous dispersion of a transparent powder coating of claim 1 having a mean particle size of no more than 20 μm.

4. The aqueous dispersion of a transparent powder coating of claim 3 having a mean particle size of from 3 to 10 μm.

5. The aqueous dispersion of a transparent powder coating of claim 1, wherein nonionic thickener of component B comprises
a) at least one nonionic associative thickener containing as structural features:
aa) a hydrophilic framework and
ab) hydrophobic groups which are capable of associative interaction in the aqueous medium.

6. The aqueous dispersion of a transparent powder coating of claim 5, wherein the nonionic associative thickener contains polyurethane chains as hydrophilic framework aa).

7. The aqueous dispersion of a transparent powder coating of claim 6, wherein the nonionic associative thickener contains polyurethane chains with polyether units as hydrophilic framework aa).

8. The aqueous dispersion of a transparent powder coating of claim 1 wherein epoxy group containing binder (a) comprises from 30 to 35% glycidyl-containing moners.

9. The aqueous dispersion of a transparent powder coating of claim 1 wherein epoxy group containing binder (a) further comprises at least one vinyl aromatic compound.

10. The aqueous dispersion of a transparent powder coating of claim 9, wherein epoxy group-containing binder (a) comprises no more than 35% by weight vinylaromatic compound, based on component Aa).

11. The aqueous dispersion of a transparent powder coating of claim 10, wherein epoxy group-containing binder (a) comprises from 10–25% by weight vinylaromatic compound, based on component Aa).

12. The aqueous dispersion of a transparent powder coating of claim 9 wherein epoxy group containing binder (a) comprises styrene.

13. The aqueous dispersion of a transparent powder coating of claim 1 wherein the at least one crosslinking agent is selected from the group consisting of straight-chain aliphatic dicarboxylic acids, carboxy-functional polyesters and mixtures thereof.

14. The aqueous dispersion of a transparent powder coating of claim 1 wherein transparent powder coating (A) further comprises
(c) an additive selected from the group consisting of catalysts, adjuvants, deaerating agents, levelling agents, UV absorbers, radical scavengers, antioxidants and mixtures thereof.

15. The aqueous dispersion of a transparent powder coating of claim 1 wherein aqueous dispersion (B) further comprises an additive selected from the group consisting of catalysts, adjuvants, defoamers, wetting agent, dispersion adjuvants, carboxy-functional dispersants, antioxidants, UV absorbers, radical scavengers, biocides, solvents, levelling agents, neutralizing agents, amines, water retaining agents and mixtures thereof.

16. A process for preparing an aqueous dispersion of a transparent powder coating comprising
  I. preparing a dispersion from a solid, powder component A and an aqueous component B, where
    component A is a transparent powder coating comprising
      a) at least one epoxy group-containing binder having a content of glycidyl-containing monomers of from 30 to 45% and
      b) at least one crosslinking agent and
    component B is an aqueous component comprising at least one nonionic thickeners;
  II. adjusting the pH of the dispersion to from 5.5 to 6.5; and
  III. filtering the dispersion.

17. The process of claim 16, further comprising the step of milling the dispersion prepared from components A and B.

18. The process of claim 17, further comprising wet milling the dispersion prepared from components A and B.

19. A method of coating vehicle bodies comprising providing a vehicle body made of sheet metal and/or plastic,
  applying a coating by means of electrostatically assisted high-speed rotation or pneumatic application wherein the coating comprises an aqueous dispersion of a transparent powder coating, consisting of a solid powder component A and an aqueous component B, wherein
    component A is a transparent powder coating comprising
      (a) at least one epoxy group-containing binder having a content of glycidyl-containing monomers of from 30 to 45%, and
      (b) at least one crosslinking agent, and
    component B is an aqueous dispersion comprising at least one nonionic thickener;
  and further wherein the aqueous dispersion has a pH between 5.5 and 6.5.

* * * * *